(12) United States Patent
Gonze et al.

(10) Patent No.: US 8,839,605 B2
(45) Date of Patent: Sep. 23, 2014

(54) EXHAUST METHANE CONTROL SYSTEMS AND METHODS

(75) Inventors: Eugene V. Gonze, Pinckney, MI (US); David B. Brown, Brighton, MI (US)

(73) Assignee: GM Global Technology Operations LLC

(*) Notice: Subject to any disclaimer, the term of this patent is extended or adjusted under 35 U.S.C. 154(b) by 721 days.

(21) Appl. No.: 13/075,535

(22) Filed: Mar. 30, 2011

(65) Prior Publication Data

US 2012/0247086 A1 Oct. 4, 2012

(51) Int. Cl.
| | |
|---|---|
| F01N 3/00 | (2006.01) |
| F01N 3/20 | (2006.01) |
| F01N 9/00 | (2006.01) |
| B01D 53/94 | (2006.01) |
| F01N 3/10 | (2006.01) |
| F01N 13/02 | (2010.01) |

(52) U.S. Cl.
CPC ........... *B01D 53/9468* (2013.01); *Y02T 10/26* (2013.01); *B01D 53/9495* (2013.01); *B01D 53/9477* (2013.01); *B01D 2255/1021* (2013.01); *B01D 2255/904* (2013.01); *F01N 2900/08* (2013.01); *F01N 3/2026* (2013.01); *F01N 3/101* (2013.01); *B01D 2255/1023* (2013.01); *F01N 9/00* (2013.01); *B01D 53/9454* (2013.01); *Y02T 10/47* (2013.01); *F01N 2900/1404* (2013.01); *F01N 2900/1402* (2013.01); *F01N 13/02* (2013.01); *Y02T 10/22* (2013.01); *B01D 2255/1025* (2013.01)
USPC .............. 60/286; 60/303; 60/276; 60/300; 60/301

(58) Field of Classification Search
CPC ......... Y02T 10/47; Y02T 10/24; Y02T 10/22; Y02T 10/26; F01N 11/00; F01N 13/02; F01N 3/2066; F01N 3/101
USPC .......................... 60/276, 300, 286, 301, 303
See application file for complete search history.

(56) References Cited

U.S. PATENT DOCUMENTS

| | | | | |
|---|---|---|---|---|
| 5,140,812 A | * | 8/1992 | Cornelison et al. | 60/300 |
| 5,232,671 A | * | 8/1993 | Brunson et al. | 422/174 |
| 5,756,057 A | * | 5/1998 | Tsuchitani et al. | 423/213.2 |
| 5,768,888 A | * | 6/1998 | Matros et al. | 60/274 |
| 5,966,931 A | * | 10/1999 | Yoshizaki et al. | 60/284 |
| 6,148,613 A | * | 11/2000 | Klopp et al. | 60/296 |

(Continued)

FOREIGN PATENT DOCUMENTS

| | | | | |
|---|---|---|---|---|
| FR | 2918581 A1 | * 1/2009 | | B01D 53/32 |
| JP | 10-002215 | 6/1998 | | |
| JP | 2000279766 A | * 10/2000 | | B01D 53/94 |

OTHER PUBLICATIONS

Machine Translation of JP 2002-279766, Translated on Jan. 10, 2014.*

(Continued)

*Primary Examiner* — Thomas Denion
*Assistant Examiner* — Patrick Maines

(57) ABSTRACT

A system for a vehicle, includes a conversion temperature determination module and a heating control module. The conversion temperature determination module generates a methane conversion temperature corresponding to a predetermined methane conversion efficiency. The heating control module selectively applies power to a substrate of an electrically heated catalyst (EHC) based on a temperature of the EHC and the methane conversion temperature. The EHC includes at least one catalyst that reacts with methane in exhaust output from an engine.

18 Claims, 5 Drawing Sheets

(56) References Cited

U.S. PATENT DOCUMENTS

| | | | |
|---|---|---|---|
| 2006/0059895 A1* | 3/2006 | Pott | 60/285 |
| 2008/0173534 A1* | 7/2008 | Da Costa et al. | 204/157.44 |
| 2009/0249772 A1* | 10/2009 | Sato et al. | 60/297 |
| 2010/0290964 A1 | 11/2010 | Southward et al. | |
| 2012/0052002 A1* | 3/2012 | Lee et al. | 423/648.1 |
| 2012/0225752 A1* | 9/2012 | Gonze et al. | 477/100 |

OTHER PUBLICATIONS

Machine Translation of FR 2918581, Translated on Jan. 10, 2014.*

* cited by examiner

EXHAUST METHANE CONTROL SYSTEMS AND METHODS

FIELD

The present disclosure is related to internal combustion engines and more particularly to exhaust control systems and methods for vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to produce drive torque. A byproduct of combustion is exhaust. The exhaust may include various components, such as nitrogen oxides (NOx), carbon monoxide (CO), and hydrocarbons (HC). An exhaust treatment system includes a catalyst that converts the NOx, CO, and HC to carbon dioxide and water.

A catalyst's conversion of a given component of the exhaust refers to the catalyst's ability to remove the component from the exhaust. A conversion efficiency, such as a NOx conversion efficiency, may be related to a temperature of the catalyst. For example only, NOx conversion efficiency may decrease as the catalyst temperature decreases and vice versa.

The catalyst temperature may be increased in various ways. For example only, heat from the exhaust gas exiting the engine may increase the catalyst temperature. The exhaust gas transfers heat to the catalyst via convection, thereby increasing the catalyst temperature. Fueling to the engine may also be adjusted to increase the catalyst temperature. For example only, unburned fuel from the engine may enter the catalyst, and the catalyst may combust the fuel with oxygen to increase the catalyst temperature. Air may be pumped into the exhaust gas and/or catalyst to increase the amount of oxygen in the catalyst.

SUMMARY

A system for a vehicle, includes a conversion temperature determination module and a heating control module. The conversion temperature determination module generates a methane conversion temperature corresponding to a predetermined methane conversion efficiency. The heating control module selectively applies power to a substrate of an electrically heated catalyst (EHC) based on a temperature of the EHC and the methane conversion temperature. The EHC includes at least one catalyst that reacts with methane in exhaust output from an engine.

A method for a vehicle, includes: generating a methane conversion temperature corresponding to a predetermined methane conversion efficiency, and selectively applying power to a substrate of an electrically heated catalyst (EHC) based on a temperature of the EHC and the methane conversion temperature. The EHC includes at least one catalyst that reacts with methane in exhaust output from an engine.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
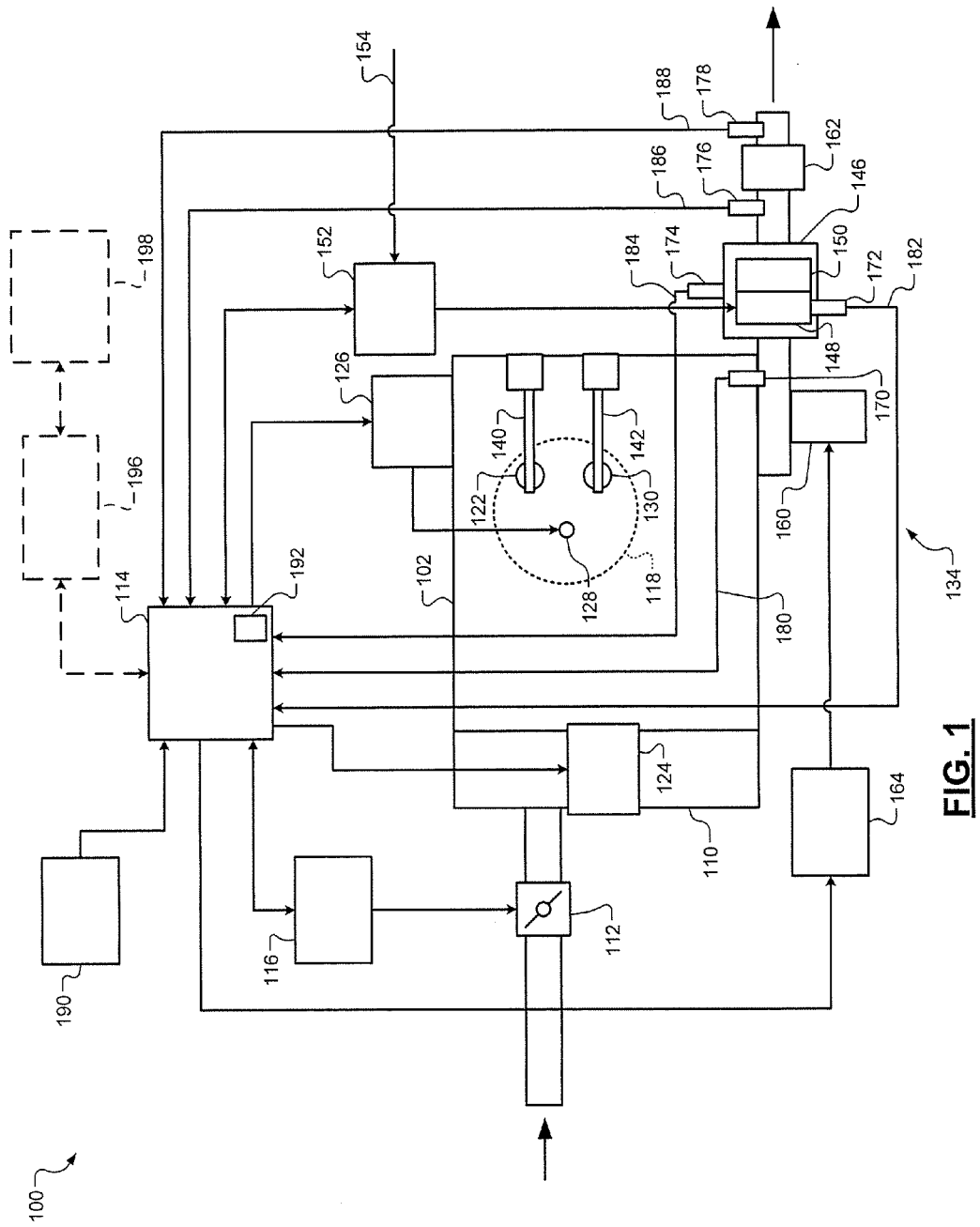
FIG. 1 is a functional block diagram of an example engine system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine combusts an air/fuel mixture within one or more cylinders to produce torque. The engine expels exhaust to an exhaust system that includes an electrically heated catalyst (EHC) and a passive, three-way catalyst (TWC). The exhaust includes methane and other components. One or more catalysts of the EHC and/or the TWC react with methane in the exhaust. However, a catalyst's ability to react with methane in the exhaust may be limited when a temperature of the catalyst is low.

A control module of the present disclosure selectively applies power to the EHC when a temperature of the EHC is less than a methane conversion temperature. When power is applied to the EHC, the EHC generates heat. Heat generated via the application of power to the EHC may warm the EHC to at least the methane conversion temperature. Additionally, heat generated by the EHC may warm the TWC. The application of power to the EHC may therefore help create a desired temperature profile across the EHC and the TWC to achieve a desired level of methane conversion.

Referring now to FIG. 1, a functional block diagram of an example vehicle system 100 is presented. The vehicle system 100 includes an engine 102 that combusts an air/fuel mixture. While the engine 102 is shown and will be discussed as a spark ignition engine, the engine 102 may be another suitable type of engine.

Air is drawn into an intake manifold 110 through a throttle valve 112. For example only, the throttle valve 112 may include a butterfly valve having a rotatable blade. An engine control module (ECM) 114 controls a throttle actuator module 116 (e.g., an electronic throttle controller or ETC). The throttle actuator module 116 controls opening of the throttle valve 112.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. Air from the intake manifold 110 is drawn into the cylinder 118 through an intake valve 122.

The ECM 114 controls a fuel actuator module 124 that regulates fuel injection to achieve a desired air/fuel mixture. Fuel may be injected into the intake manifold 110 at a central location or at multiple locations, such as near the intake valve(s) of each of the cylinders. In various implementations not depicted in FIG. 1, fuel may be injected directly into the cylinders in various types of engines, such as spark ignition direct injection (SIDI) engines, compression ignition engines, and other types of engines. The injected fuel mixes with air and creates an air/fuel mixture in the cylinder 118.

A piston (not shown) compresses the contents of the cylinder 118. Based on a signal from the ECM 114, a spark actuator module 126 may energize a spark plug 128, which ignites the air/fuel mixture. The timing of the spark may be specified relative to the time when the piston is at a topmost position, referred to as top dead center (TDC). The signal from the ECM 114 may indicate how far before or after TDC position the spark should be provided. Operation of the spark actuator module 126 may therefore be synchronized with crankshaft rotation. The spark actuator module 126 and the spark plug 128 may be omitted in various types of engines, such as diesel type engines.

The combustion of the air/fuel mixture drives the piston away from the TDC position, thereby driving a rotating crankshaft (not shown). After reaching a bottommost position, referred to as bottom dead center (BDC), the piston begins moving toward the TDC position again and expels the byproducts of combustion (exhaust) to an exhaust system 134 via an exhaust valve 130.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The exhaust system 134 includes a catalyst assembly 146. The catalyst assembly 146 includes an electrically heated catalyst (EHC) 148 and a passive, three-way catalyst (TWC) 150. The TWC 150 is located downstream of the EHC 148. A heater actuator module 152 selectively applies power 154 to the EHC 148 based on signals from the ECM 114. The power 154 may be provided by an energy storage device (ESD), such as one or more batteries, a generator, and/or one or more other suitable power sources.

The exhaust system 134 may also include a secondary air pump 160, a second TWC 162, and one or more other exhaust treatment devices. The secondary air pump 160 may pump ambient air into the exhaust system 134 upstream of the catalyst assembly 146. A pump actuator module 164 may control operation of the secondary air pump 160 based on signals from the ECM 114. The second TWC 162 is implemented downstream of the catalyst assembly 146.

The EHC 148, the TWC 150, and the second TWC 162 each include a substrate, such as cordierite, steel (e.g., stainless), and/or one or more other suitable materials. The substrates may be formed in a honeycomb arrangement or in another suitable arrangement. The substrate of the EHC 148 is electrically resistive/conductive. In this manner, the substrate of the EHC 148 functions as a resistive heater when power is applied. Electrical connectors (not shown) are provided with the EHC 148 to enable power to be applied to the substrate of the EHC 148.

A catalyst is applied to each of the substrates. The catalyst may include, for example, platinum, rhodium, palladium, and/or another suitable three-way catalyst. The catalyst reacts with various components of the exhaust gas to reduce the amount of those components in the exhaust gas. For example only, the catalyst may react with nitrogen oxides (NOx), hydrocarbons (HC), and carbon oxides (CO). One type of HC is methane ($CH_4$).

Figure 2:
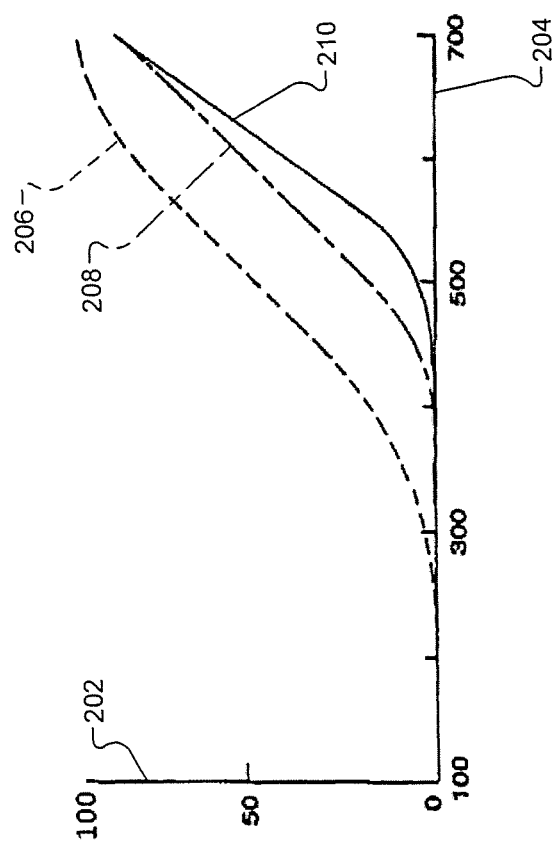
FIG. 2 is an example graph of methane conversion efficiency as a function of temperature for various types of catalysts.

Methane conversion efficiency of the catalyst(s) of the EHC 148, the TWC 150, and the second TWC 162 is dependent upon temperature of the catalyst(s). FIG. 2 includes an example graph of methane conversion efficiency 202 of various types of catalysts as a function of catalyst temperature 204. For example only, FIG. 2 includes graphs of the methane conversion efficiency 202 of palladium 206, rhodium 208, and platinum 210 as functions of the catalyst temperature 204. As illustrated in FIG. 2, as the catalyst temperature 204 increases, the methane conversion efficiency 202 generally increases and vice versa.

Referring back to FIG. 1, the methane conversion efficiency of the catalyst(s) is also dependent upon equivalence ratio (EQR) of the air/fuel mixture combusted within the engine 102. The EQR refers to a ratio of the air/fuel mixture combusted relative to a stoichiometric air/fuel mixture. The EQR is 1.0 when the air/fuel mixture combusted is a stoichiometric mixture. The EQR is greater than 1 when the air/fuel mixture supplied to the engine is more fuel rich than the stoichiometric mixture, and the EQR is less than 1 when the air/fuel mixture supplied to the engine 102 is fuel lean relative to the stoichiometric mixture.

Figure 3:
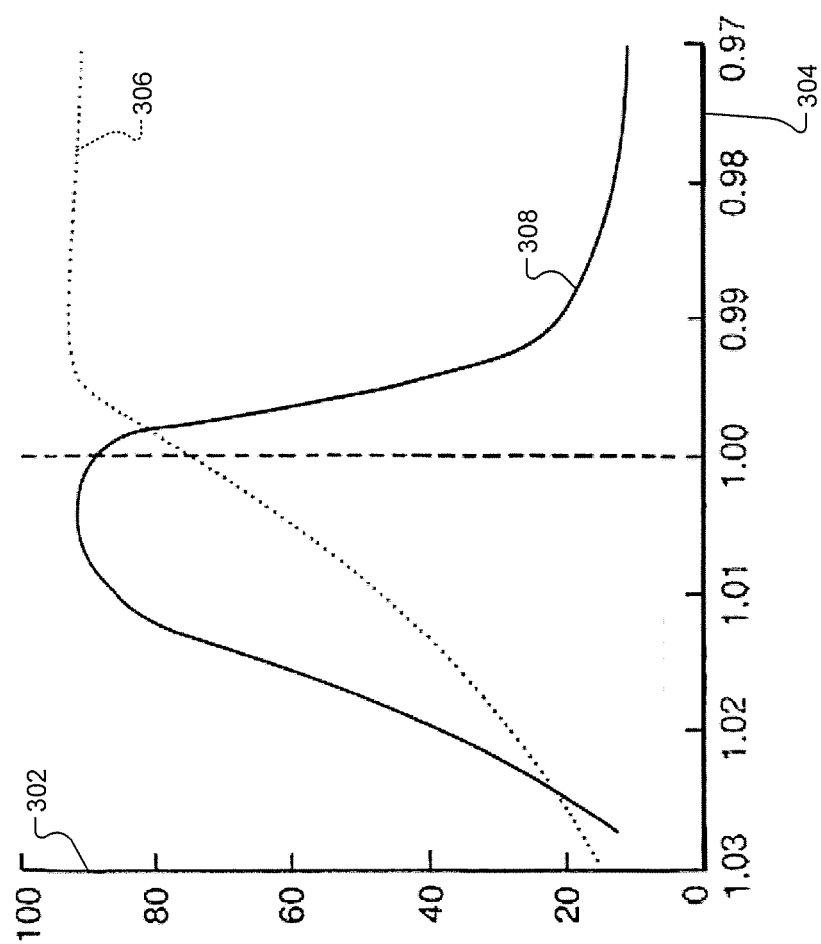
FIG. 3 is an example graph of hydrocarbon conversion efficiency as a function of equivalence ratio for methane and for gasoline.

FIG. 3 includes an example graph of conversion efficiency 302 as a function of EQR 304. Example trace 306 tracks hydrocarbon conversion efficiency for a gasoline engine as a function of the EQR 304. Example trace 308 tracks methane conversion efficiency as a function of the EQR 304. The methane conversion efficiency 308 may be greater than a predetermined value (e.g., 30 percent) when the EQR 304 is within a predetermined range (e.g., between 0.997 and 1.024 in various implementations).

Referring back to FIG. 1, the ECM 114 may use signals from various sensors to make control decisions for the vehicle system 100. The ECM 114 also controls operation of the engine 102 and the torque output of the engine 102. The ECM 114 may communicate with a hybrid control module 196 to coordinate operation of the engine 102 and an electric motor 198. While only the electric motor 198 is shown, the hybrid vehicle system 100 may include more than one electric motor and/or motor generator unit.

The sensors may include, for example, a first exhaust temperature sensor 170, an EHC temperature sensor 172, a catalyst temperature sensor 174, a second exhaust temperature sensor 176, and a third exhaust temperature sensor 178. The first exhaust temperature sensor 170 measures temperature of the exhaust upstream of the catalyst assembly 146 and generates a first exhaust temperature signal (TA) 180 based on the exhaust temperature.

The EHC temperature sensor 172 measures a temperature of the EHC 148 and generates an EHC temperature signal (TEHC) 182 based on the temperature of the EHC 148. The catalyst temperature sensor 174 measures a combined temperature of the EHC 148 and the TWC 150 and generates a catalyst temperature signal (TCAT) 184 based on the temperature.

The second and third exhaust temperature sensors 176 and 178 measure temperature of the exhaust between the catalyst assembly and the second TWC 162 and downstream of the second TWC 162, respectively. The second and third exhaust temperature sensors 176 and 178 generate second and third exhaust temperature signals (TB and TC) 186 and 188 based on the exhaust temperatures at their locations, respectively. The vehicle system 100 may include one or more other sensors 190. For example only, the other sensors 190 may include an exhaust flow rate (EFR) sensor, a mass air flowrate (MAF) sensor, a fuel sensor, and/or one or more other sensors. One or more of the shown and described sensors may be omitted in various implementations.

Applying power to the EHC 148 causes the EHC 148 to generate heat. The EHC 148 radiates heat to the TWC 150. In this manner, the radiant heating provided by the EHC 148 may increase the total volume of the catalyst (i.e., the combined volume of the EHC 148 and the TWC 150) that may be able to react with methane at a given time.

The ECM 114 includes a methane control module 192. Based on a temperature of the EHC 148, the methane control module 192 selectively applies power to the EHC 148. More specifically, the methane control module 192 selectively applies power to the EHC 148 when the EHC temperature is less than a methane conversion (e.g., oxidation) temperature. This warms the EHC 148 and the TWC 150, thereby enabling a desired level of methane conversion efficiency to be achieved.

Figure 4:
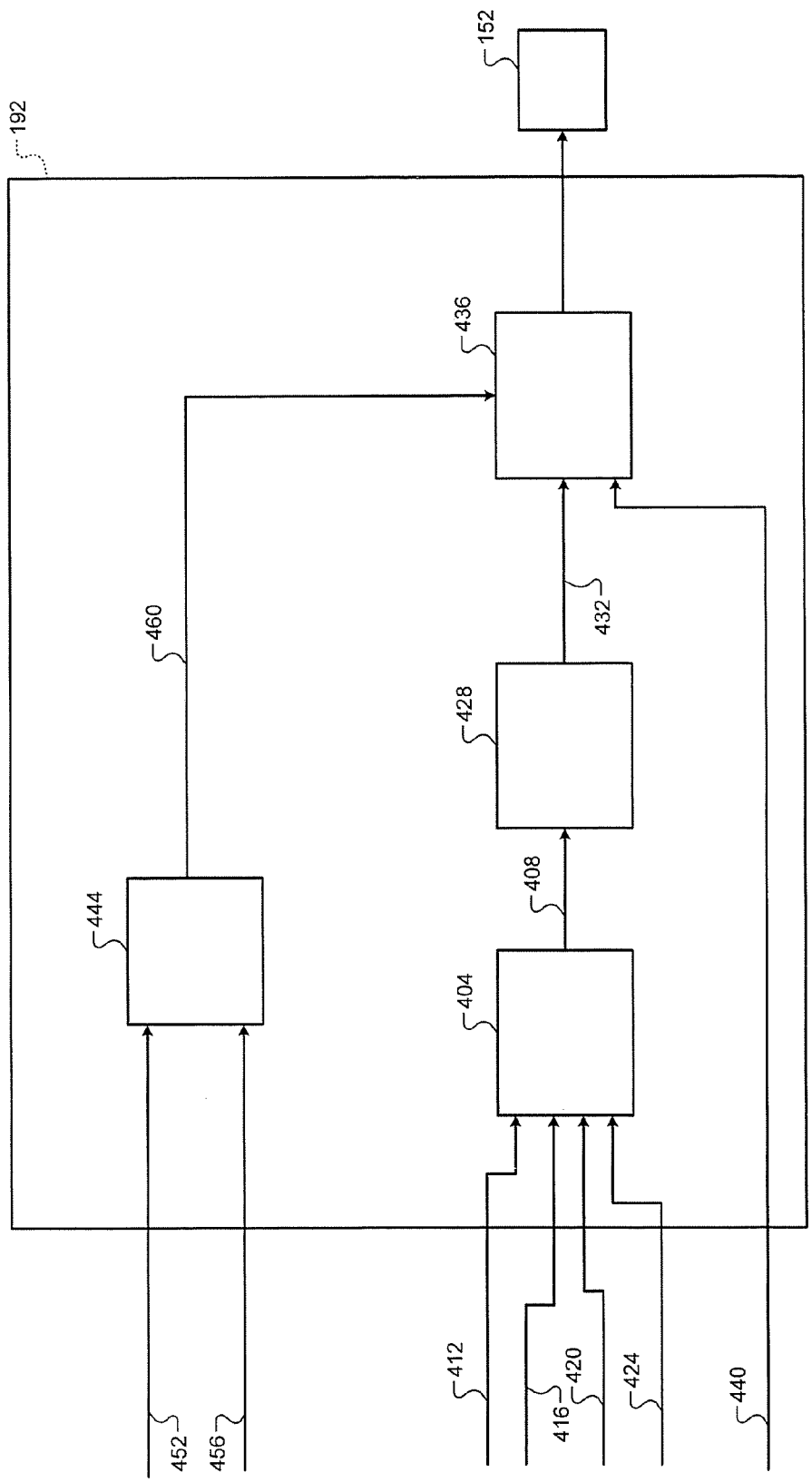
FIG. 4 is a functional block diagram of an example implementation of a methane control module according to the present disclosure.

Referring now to FIG. 4, a functional block diagram of an example implementation of the methane control module 192 is presented. An output estimation module 404 generates an estimated methane output amount (e.g, parts per million or ppm) 408 of the engine 102. The output estimation module 404 may generate the estimated methane output 408 based on, for example, a type of the fuel 412 being supplied to the engine 102, an EQR 416 of the air/fuel mixture being supplied to the engine 102, a spark timing 420, and/or an EFR 424.

The fuel type 412 may indicate, for example, gasoline, ethanol, diesel, or another type of fuel. The fuel type 412 may be, for example, obtained from a fuel sensor or determined in various implementations. The spark timing 420 may be, for example, commanded spark timing for combustion. The EFR 424 may, for example, be measured using an EFR sensor or determined based on one or more suitable parameters, such as the MAF. For example only, the output estimation module 404 may generate the estimated methane output 408 using a function or a mapping that relates the fuel type 412, the EQR 416, the spark timing 420, and the EFR 424 to the estimated methane output 408.

The output estimation module 404 may increase the estimated methane output 408 as the ethanol content of the fuel type 412 increases. Additionally or alternatively, the output estimation module 404 may increase the estimated methane output 408 as the EFR 424 increases. Additionally or alternatively, the output estimation module 404 may increase the estimated methane output 408 as the spark timing 420 advances. The output estimation module 404 may generate the estimated methane output 408 further based on one or more other suitable engine operating parameters, such as a combustion mode.

A conversion temperature determination module 428 generates a methane conversion temperature 432 based on the estimated methane output 408. The conversion temperature determination module 428 may determine the methane conversion temperature 432, for example, using a function or a mapping that relates the estimated methane output 408 to the methane conversion temperature 432. For example only, the conversion temperature determination module 428 may selectively increase the methane conversion temperature 432 as the estimated methane output 408 increases and vice versa.

In various implementations, the methane conversion temperature 432 may be a constant predetermined temperature. For example only, the predetermined temperature may be between approximately 500 degrees (°) Celsius (C) and approximately 700° C. The predetermined temperature and the function or mapping may be calibrated based on achieving at least a predetermined minimum methane conversion efficiency such that less than a predetermined maximum amount of methane is output from the exhaust system 134. The methane conversion temperature 432 corresponds to the temperature at which the catalyst(s) of the EHC 148, the TWC 150, and the second TWC 162 will achieve the predetermined minimum methane conversion efficiency.

An EHC heating control module 436 receives the methane conversion temperature 432 and an EHC temperature 440. The EHC temperature 440 may be measured using the EHC temperature sensor 172 or estimated based on one or more measured parameters in various implementations.

An enabling/disabling module 444 selectively enables and disables the EHC heating control module 436. The enabling/disabling module 444 may enable or disable the EHC heating control module 436 based on a catalyst temperature 452 and an electrical capacity 456. The catalyst temperature 452 may be measured using the catalyst temperature sensor 174 or estimated based on one or more measured parameters in various implementations. The electrical capacity 456 may be, for example, determined based on power stored in an ESD and power being drawn from the ESD. The electrical capacity 456 may correspond to an amount of power stored by the ESD available for use by inactive vehicle components, such as the EHC 148.

For example only, the enabling/disabling module 444 may disable the EHC heating control module 436 when the catalyst temperature 452 is greater than a predetermined enabling temperature. The predetermined enabling temperature may be approximately 500° C. or another suitable temperature. The enabling/disabling module 444 may additionally or alternatively disable the EHC heating control module 436 when the electrical capacity 456 is less than a predetermined capacity. The predetermined capacity may be set based on an estimated amount of power needed to heat the EHC 148 to, for example, the methane conversion temperature 432.

The enabling/disabling module 444 may enable the EHC heating control module 436 when the catalyst temperature 452 is less than the predetermined enabling temperature and the electrical capacity 456 is greater than the predetermined capacity. The enabling/disabling module 444 may enable and disable the EHC heating control module 436 via a trigger signal 460. For example only, the enabling/disabling module 444 may set the trigger signal 460 to an active state to enable the EHC heating control module 436 and may set the trigger signal 460 to an inactive state to disable the EHC heating control module 436.

When the catalyst temperature 452 is less than the predetermined enabling temperature but the electrical capacity 456 is less than the predetermined capacity, the enabling/disabling module 444 may enable performance of an alternate methane conversion strategy. For example only, the ECM 114 may retard the spark timing 420, provide a rich air/fuel mixture to the engine 102, and/or activate the secondary air pump 160 for the alternate methane conversion strategy.

When enabled, the EHC heating control module 436 selectively applies power to the EHC 148 via the heater actuator module 152 based on the EHC temperature 440 and the methane conversion temperature 432. More specifically, the EHC heating control module 436 may apply power to the EHC 148 when the EHC temperature 440 is less than the methane conversion temperature 432. The EHC heating control module 436 may disconnect power from the EHC 148 when the EHC temperature 440 is greater than the methane conversion temperature 432.

Heating the EHC 148 to greater than or equal to the methane conversion temperature 432 creates a predetermined temperature profile across the EHC 148 and the TWC 150 that achieves a desired level of methane conversion efficiency. Additionally, the second TWC 162 may be warmed (e.g., via heat from the catalyst assembly 146 and methane oxidation heat) which may increase methane conversion efficiency.

Figure 5:
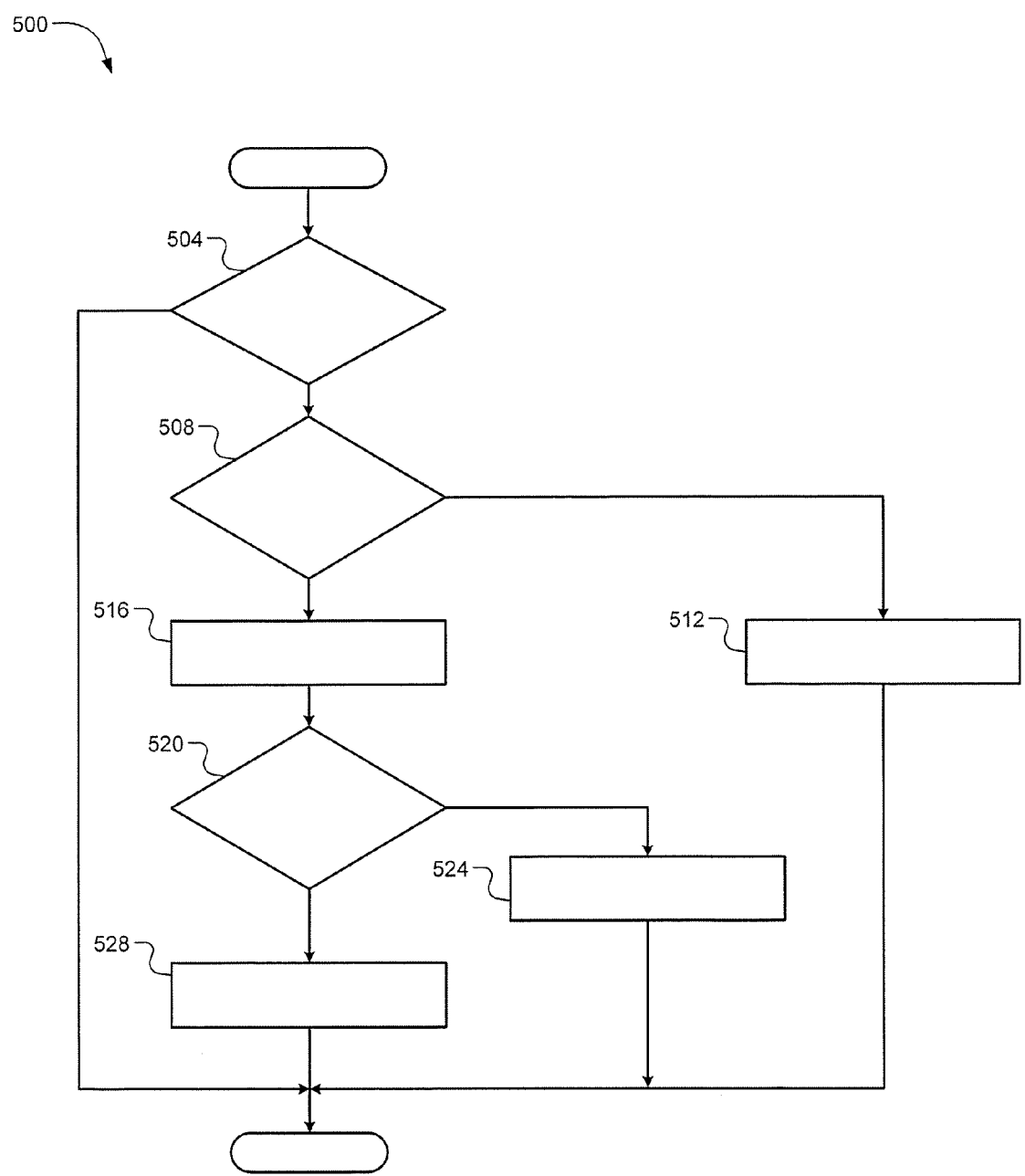
FIG. 5 is a flowchart depicting an example method of controlling power to an electrically heated catalyst according to the present disclosure.

Referring now to FIG. 5, a flowchart depicting an example method 500 of controlling the application of power to the EHC 148 is presented. Control begins with 504 where control determines whether the catalyst temperature 452 is less than the predetermined enabling temperature. If true, control proceeds with 508; if false, control may end. For example only, the predetermined enabling temperature may be approximately 500-700° C.

At 508, control determines whether the electrical capacity 456 is greater than the predetermined capacity. If false, control may enable performance of an alternate methane conversion strategy at 512 and control may end. If true, control may continue with 516. For example only, the alternate methane conversion strategy may include retarding the spark timing 420, providing a rich air/fuel mixture (i.e., EQR >1.0) to the engine 102, and activating the secondary air pump 160.

Control generates the methane conversion temperature 432 at 516. Control may determine the methane conversion temperature 432 based on the estimated methane output 408 of the engine 102, which may be determined based on the fuel type 412, the EQR 416, the spark timing 420, and/or the EFR 424. Control determines whether the EHC temperature 440 is greater than the methane conversion temperature 432 at 520. If true, control applies power to the EHC 148 at 524 and control ends; if false, control may disable the flow of power to the EHC 148 (if it is not already disabled) at 528 and control ends. While control is shown and described as ending, the method 500 may be illustrative of one loop and control may return to 504.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
a first electronic circuit configured to generate a methane conversion temperature corresponding to a predetermined methane conversion efficiency, and selectively increase the methane conversion temperature when an exhaust flow rate increases; and
a second electronic circuit configured to apply power to a substrate of an electrically heated catalyst (EHC) based on comparison of a temperature of the EHC and the methane conversion temperature,
wherein the EHC includes at least one catalyst that reacts with methane in exhaust output from an engine.

2. The system of claim 1 wherein the at least one catalyst includes at least one of Platinum, Rhodium, and Palladium.

3. The system of claim 1 wherein the first electronic circuit selectively increases the methane conversion temperature as an ethanol content of a type of fuel supplied to the engine increases.

4. The system of claim 1 further comprising a third electronic circuit configured to disable the second electronic circuit when a second temperature of the EHC and a three-way catalyst (TWC) is greater than a predetermined temperature,
wherein the EHC and the TWC are both housed within one housing.

5. The system of claim 1 further comprising a third electronic circuit configured to disable the second electronic circuit when an electrical capacity is less than a predetermined value,
wherein the electrical capacity corresponds to an amount of power available for use by electrical devices that are not receiving power.

6. The system of claim 1 further comprising a fourth electronic circuit configured to generate an estimated methane output of the engine, wherein the first electronic circuit generates the methane conversion temperature based on the estimated methane output.

7. The system of claim 6 wherein the first electronic circuit generates the methane conversion temperature using one of a function and a mapping that relates the estimated methane output to the methane conversion temperature.

8. The system of claim 6 wherein the fourth electronic circuit generates the estimated methane output based on a type of fuel being supplied to the engine, an equivalence ratio of an air/fuel mixture being supplied to the engine, a spark timing of combustion within the engine, and the exhaust flow rate.

9. The system of claim 6 wherein the first electronic circuit selectively increases the methane conversion temperature as the estimated methane output increases and selectively decreases the methane conversion temperature as the estimated methane output decreases.

10. A method for a vehicle, comprising:
generating a methane conversion temperature corresponding to a predetermined methane conversion efficiency;
increasing the methane conversion temperature when an exhaust flow rate increases; and
selectively applying power to a substrate of an electrically heated catalyst (EHC) based on a comparison of a temperature of the EHC and the methane conversion temperature,
wherein the EHC includes at least one catalyst that reacts with methane in exhaust output from an engine.

11. The method of claim 10 wherein the at least one catalyst includes at least one of Platinum, Rhodium, and Palladium.

12. The method of claim 10 further comprising selectively increasing the methane conversion temperature as an ethanol content of a type of fuel supplied to the engine increases.

13. The method of claim 10 further comprising disabling power flow to the substrate of the EHC when a second temperature of the EHC and a three-way catalyst (TWC) is greater than a predetermined temperature,
wherein the EHC and the TWC are both housed within one housing.

14. The method of claim 10 disabling power flow to the substrate of the EHC when an electrical capacity is less than a predetermined value,
wherein the electrical capacity corresponds to an amount of power available for use by electrical devices that are not receiving power.

15. The method of claim 10 further comprising:
generating an estimated methane output of the engine; and
generating the methane conversion temperature based on the estimated methane output.

16. The method of claim 15 further comprising generating the methane conversion temperature using one of a function and a mapping that relates the estimated methane output to the methane conversion temperature.

17. The method of claim 15 further comprising generating the estimated methane output based on a type of fuel being supplied to the engine, an equivalence ratio of an air/fuel mixture being supplied to the engine, a spark timing of combustion within the engine, and the exhaust flow rate.

18. The method of claim 15 further comprising selectively increasing the methane conversion temperature as the estimated methane output increases and selectively decreases the methane conversion temperature as the estimated methane output decreases.

* * * * *